(12) United States Patent
Frank

(10) Patent No.: US 7,731,122 B2
(45) Date of Patent: Jun. 8, 2010

(54) METHOD FOR MANAGING THE WHEEL STEERING CONTROL OF AN AIRCRAFT

(75) Inventor: David Frank, Paris (FR)

(73) Assignee: Messier-Bugatti, Villacoublay (FR)

( * ) Notice: Subject to any disclaimer, the term of this patent is extended or adjusted under 35 U.S.C. 154(b) by 159 days.

(21) Appl. No.: 11/965,413

(22) Filed: Dec. 27, 2007

(65) Prior Publication Data
US 2008/0203217 A1 Aug. 28, 2008

(30) Foreign Application Priority Data
Feb. 27, 2007 (FR) .................................. 07 01410

(51) Int. Cl.
*B64C 25/50* (2006.01)
(52) U.S. Cl. .................... 244/50; 244/51; 244/99.2; 244/100 R; 244/103 W; 244/183; 244/184
(58) Field of Classification Search .................. 244/50, 244/51, 99.2, 100 R, 103 W, 1 R, 183, 184
See application file for complete search history.

(56) References Cited

U.S. PATENT DOCUMENTS

| 2,919,933 | A | | 1/1960 | Olson | |
|---|---|---|---|---|---|
| 4,007,890 | A | * | 2/1977 | Bremer et al. | 244/50 |
| 4,113,041 | A | * | 9/1978 | Birkeholm | 180/14.1 |
| 4,923,253 | A | * | 5/1990 | Pollner et al. | 303/7 |
| 4,991,862 | A | * | 2/1991 | Tsao et al. | 280/421 |
| 5,219,033 | A | * | 6/1993 | Pollner et al. | 180/14.6 |
| 5,381,987 | A | * | 1/1995 | Carns | 244/50 |
| 5,513,821 | A | * | 5/1996 | Ralph | 244/50 |
| 6,305,484 | B1 | * | 10/2001 | Leblanc | 180/167 |
| 6,928,363 | B2 | * | 8/2005 | Sankrithi | 701/120 |

FOREIGN PATENT DOCUMENTS

| EP | 1 342 645 | 9/2003 |
|---|---|---|
| GB | 837 891 | 6/1960 |

* cited by examiner

*Primary Examiner*—Timothy D Collins
*Assistant Examiner*—Justin Benedik
(74) *Attorney, Agent, or Firm*—Sughrue Mion, PLLC

(57) ABSTRACT

The invention relates to a method for managing a steering control of an aircraft landing gear provided with at least one wheel steerable by the steering control, comprising the following steps:
 monitoring one or several taxi parameter(s) (51, 54, 64, 59, 61) of the aircraft to determine whether said aircraft enters a towing situation,
 setting the steering control in a free steering mode of the steerable wheel, if the aircraft enters the towing situation;
 activating the steering control so that the steerable wheel has an angular controlled steering by the steering control if the aircraft leaves said towing situation.

10 Claims, 4 Drawing Sheets

METHOD FOR MANAGING THE WHEEL STEERING CONTROL OF AN AIRCRAFT

The invention relates to a method for managing the wheel steering control of an aircraft.

BACKGROUND OF THE INVENTION

In airports, aircrafts are often towed by tractors, more particularly in the vicinity of air terminals. For this purpose, it is known to connect an aircraft to a tractor using a bar fastened to a fastening point located on the auxiliary landing gear of the aircraft, more precisely on the lower part of the latter which carries the wheel or wheels. Towing the aircraft using a tractor especially adapted for towing the aircraft directly by the wheels, of the auxiliary landing gear is also known. To enable the lower part of the landing gear to be steered to follow the motions imposed by the tractor, it is important to uncouple such lower part from the rest of the aircraft in rotation.

Such uncoupling can be obtained by uncoupling the arms of the torque linkage which connect the lower part to the wheel steering element, the function of which consists in steering the wheel or wheels in response to a steering command given by the pilot. Such method has the disadvantage of requiring the intervention of a ground operator as close to the auxiliary landing gear as possible, which can be dangerous if the pilot unduly activates the steering element. Besides, it is sometimes difficult to connect the arms of the torque linkage to each other, when the towing is completed. In addition, the ground operator can forget to connect the torque linkage arms upon completion of the towing.

Such uncoupling can also be obtained by deactivating the steering control, i.e. by placing the steering control in a free steering mode, in which the steering element becomes passive and leaves the rotation of the lower part of the landing gear free, which avoids separating the arms of the torque linkage. In this last case, the auxiliary landing gear is generally equipped with a neutralization lever which is activated by a ground operator to place the steering control in a free steering mode. Then again, the operator must get as close to the auxiliary landing gear as possible to activate the neutralization lever Besides, a lever is carried by a neutralization element positioned on the auxiliary landing gear, in an uncovered area exposed to bad weather and to vibrations, which may lead to a malfunction of the lever or of the associated contactor. Then, the towing may be performed when the steering control has not been placed in the free steering mode, such that the non neutralized steering control attempts to oppose any steering of the wheel caused by the tractor towing the aircraft to keep the wheels in the orientation requested by the steering control, which can lead to a deterioration of the towing bar and of its hook on the auxiliary landing gear, and in any case to a useless fatigue of the steering element. Besides, the operator can simply forget to activate the neutralization element, which can result in the same disadvantages.

To remedy these disadvantages, it was thought to position the neutralization lever under cover, i.e. directly in the aircraft cockpit. Thus, the pilot himself activates the neutralization lever to place the steering element in free steering mode with a view to enable the towing of the aircraft. But the pilot can also forget to activate the neutralization lever which can result; in the same disadvantages. Besides, when the pilot is not in the aircraft, a second operator must take the controls to activate the lever, which is not practical.

OBJECT OF THE INVENTION

The invention aims at offering another solution, making it possible to avoid the above mentioned disadvantages.

BRIEF DESCRIPTION OF THE INVENTION

To reach this aim, the invention provides a method for managing the steering control of at least one steerable wheel of an aircraft landing gear consisting in:
  monitoring at least one aircraft taxi parameter to determine if the aircraft enters a towing situation or leaves a towing situation,
  automatically placing the steering control in a free steering mode if the aircraft enters said towing situation;
  automatically reactivating the steering control if the aircraft leaves said towing situation.

Thus, the steering control is automatically placed in the free steering mode when a towing situation is identified, such that if a towing is being performed, it can be carried out without the risk of damaging the steering control. The control is then automatically reactivated as soon as the aircraft leaves the towing situation, such that the pilot is sure to have access to the steering control during the aircraft taxi.

The method thus makes it possible to eliminate the lever and all the disadvantages connected to the utilization of such lever: no reliability, possible oversight by the operator . . . . Such method makes it possible to further avoid any intervention by the operator on the landing gear itself other, than the possible hooking of the towing bar which is a guarantee of safety.

According to a first embodiment, the towing situation corresponds to a potential towing situation in which the aircraft is likely to be towed. Preferably, such situation corresponds to the detection of the following event: the aircraft has stopped for some time and the braking control has not been activated for some time.

According to a particular aspect of the invention, the steering control is activated again in response to the detection of an event signaling the end of the towing situation, and preferably upon the occurring of at least one of the following events:
  the engine thrust exceeds a predetermined threshold;
  the taxi speed of the aircraft exceeds a predetermined threshold;
  the controlled steering angular velocity exceeds a predetermined threshold;
  the braking control is activated.

Thus, the steering control is automatically activated again as soon as an event signaling the end of the towing situation is detected, such that the pilot is sure to have authority on the steering control.

BRIEF DESCRIPTION OF THE DRAWINGS

The invention will be better understood when reading to the description below and while referring to the figures of the appended drawings, among which.

DETAILED DESCRIPTION OF THE INVENTION

Figure 1:
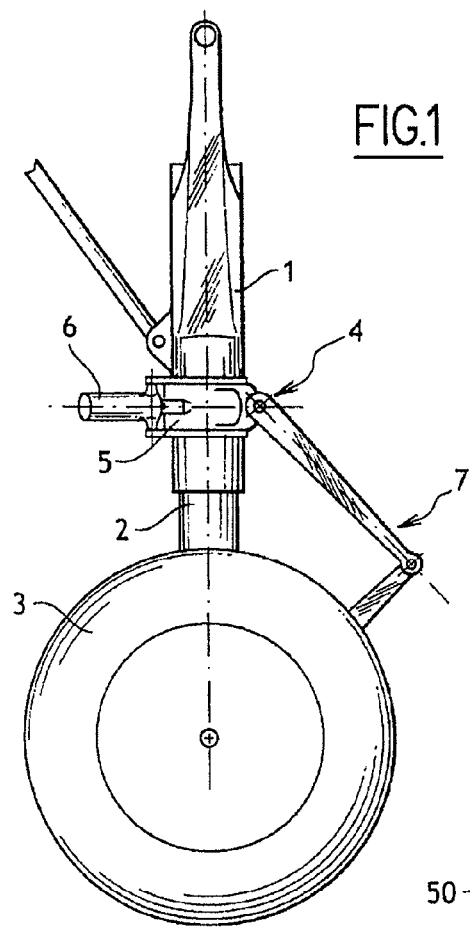
FIG. 1 is a view of an auxiliary landing gear to which a towing bar has been fastened.
Figure 2:
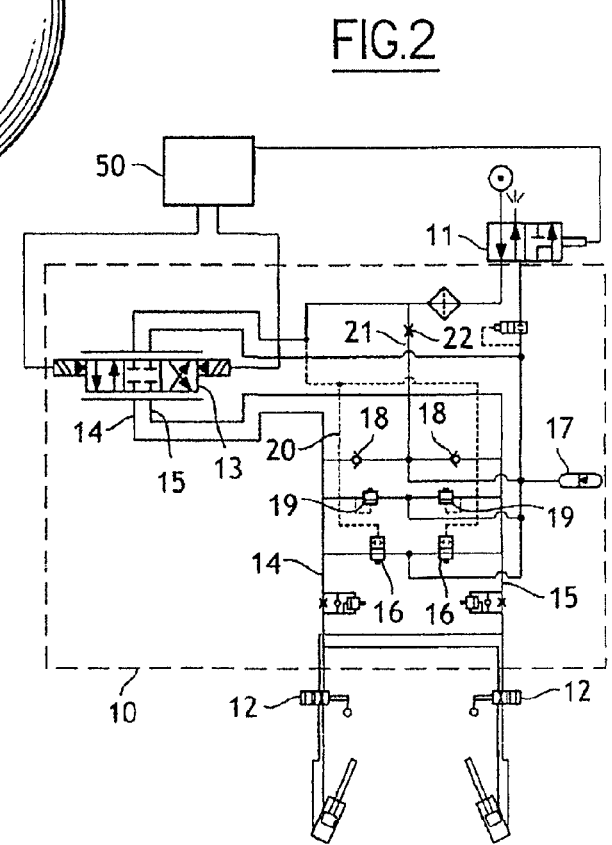
FIG. 2 is a hydraulic diagram of a steering hydraulic control equipping the landing gear of FIG. 1.

While referring to FIG. 1, an aircraft auxiliary landing gear includes a box 1 which is directly connected to the aircraft structure and in which a rod 2 is mounted to slide in a telescopic way and constitute a dumper with the box. The rod 2 carries, in its lower part, two wheels 3. The box 1 includes a steering element 4 including a collar 5 which is mounted for rotating around the box 1 and activated by steering jacks 6. The collar 5 is connected to the rod 2 by means of torque linkage 7 comprising two articulated arms, such that the angular position of the rod 2 is determined by the angular position of the collar 5. To steer the wheels 3, it is sufficient to control the steering jacks 6 to rotate the collar 5, which drives the rod 2 into rotation by means of the torque linkage 7. To control the steering jacks 6, the aircraft is provided with a jack supplying hydraulic circuit illustrated in FIG. 2 which, in response to the pilot's instruction, selectively supplies the steering jacks 6 to rotate the collar 5 and thus to steer the wheels 3.

The hydraulic circuit includes a hydraulic connecting block 10 symbolically illustrated in doted lines, which is connected to the pressure line and to a return line of the hydraulic circuit of the aircraft via a valve 11 controlled by a computer 50. The hydraulic connecting block 10 includes four outlet ports, coupled two by two, in order to selectively supply the four chambers of the two steering jacks 6 via rotating valves 12. The hydraulic connecting block 10 includes a servovalve 13 which is controlled by the computer 50 to distribute the pressure into the steering jacks 6 in response to the pilot's steering instruction. Two outlet ports among the hydraulic connecting block outlets 10 are associated with a first outlet 14 of the servovalve 13 and the two other ports are associated with a second outlet 15 of the servovalve 13.

The hydraulic connecting block 10 includes short-circuit valves 16 to short-circuit the outlets 14, 15 when the hydraulic connecting block 10 is not fed (which means when valve 11 is in return position). The short-circuit position makes it possible, during a forced steering of the wheels, for example during a towing operation, to transfer the hydraulic fluid from the jacks 6 chambers, the volume of which diminishes, towards the jacks 6 chambers, the volume of which increases. The difference in volume is absorbed by an accumulator 17 connected to a central point between the short-circuit valves 16.

The short-circuit valves 16 are hydraulically-controlled (see line 20 in short dots) to be closed when the hydraulic connecting block 10 is pressurized, such that both outlets 14, 15 are then isolated. To compensate for the difference in the volume of hydraulic fluid, it is provided to supply either one of the outlets 14, 15 by the accumulator 16 via check valves 18. Besides, pressure relief valves 19 make it possible to send to the accumulator 17 an overflow of hydraulic fluid from the jacks 6 through either one of the outlets 14, 15.

To keep the accumulator 17 under pressure and prevent it from emptying to the return circuit, the hydraulic connecting block includes a calibrated valve 15 positioned on the hydraulic connecting block 10 return line. This calibrated valve 15 further makes it possible to keep the assembly of the hydraulic connecting block 10 and the jacks 6 at the calibration pressure which is above the return pressure, which avoids any cavitation in the block connecting 10 and in the jacks 6. When the hydraulic connecting block 10 is under pressure, a supply line 21 makes it possible, through a restrictor 22, to fill the accumulator 17 in case the latter is partially emptied.

All this is well known and is reminded to give the context of the invention.

The invention aims at placing the steering control in a free steering mode in response to the detection by the computer 50 of a towing situation in which the aircraft is towed or is likely to be towed, and to reactivate the steering control when the aircraft leaves the towing situation or is not in this situation. Such a situation is detected by monitoring one or several taxi parameter(s) (in practice, signals which can be combined according to a predetermined logic), such as the aircraft speed, a braking instruction, the wheel steering angular, velocity, . . . .

As a matter of fact, in this case, the free steering can be obtained by at least one of the two following means:
  the computer 50 gives an instruction to the valve 11 to place it in the return position. The hydraulic connecting block 10 is no longer submitted to the pressure of the aircraft and the short-circuit valves 16 are placed in a short-circuit, position. When the aircraft is towed which can lead to a forced rotation of the collar 5, a transfer of fluid between the jack 6 chambers, the volume of which is reduced and the jacks 6 chambers, the volume of which increases, occurs via the short-circuit valves 16, and the difference in volume being stored or delivered by the accumulator 17. This means shall hereinafter be referred to as return of the steering hydraulic connecting block;
  or the calculator 50 gives an instruction to the servovalve 13 so that it remains in neutral position whatever the steering instruction from the pilot. The valve 11 remains in pressurization position, such that the hydraulic connecting block 10 is still supplied and the short-circuit valves 16 remain closed. However, when the aircraft is towed, which can lead to a forced rotation of the collar 5, a transfer of fluid between the jacks 6 chambers, the volume of which is reduced and the jacks 6 chambers, the volume of which increases, occurs via the check valves 18 and the pressure relief valves 19, the difference in pressure being stored or delivered by the accumulator 17. According to a particular provision, if the servovalve is of the anchoring type, the transfers of fluids take partially place at least through the existing holes between the slide of the servovalve and its sleeve, when the slide is held in neutral position, which prevents a pressure rise in the hydraulic connecting block and the operation of pressure relief valves 19. The neutralization of the servovalve thus allows the free steering of wheels 3. These means will be called hereinafter servovalves neutralization.

Optionally, both means can be used simultaneously.

Figure 3:
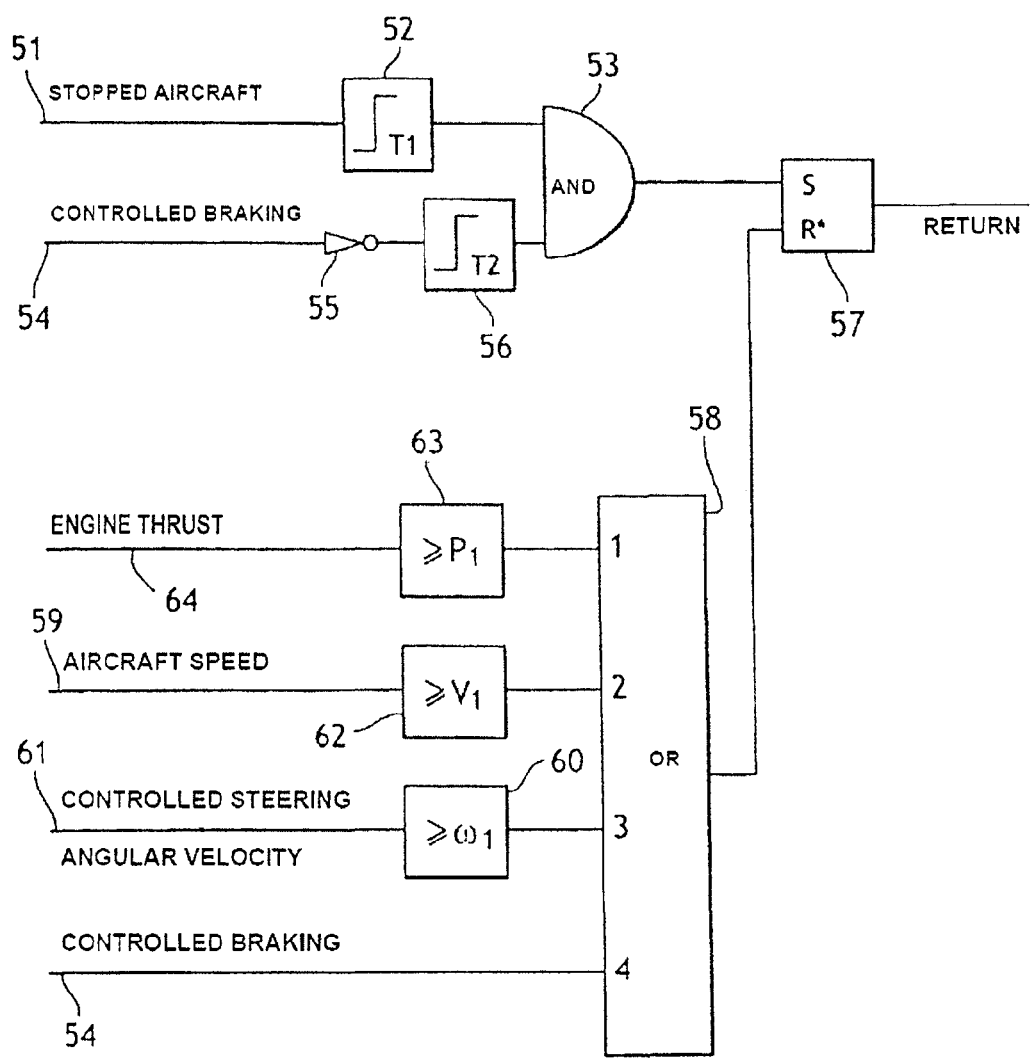
FIG. 3 is a diagram of a logic for the passage of the steering control to the free steering mode, according to a first embodiment of the method of the invention.

According to a first embodiment of the method of the invention illustrated in FIG. 3, the computer 50 monitors an aircraft stop signal 51 which is 1, if the aircraft is stopped (or taxiing at a very small residual speed), and 0 if the aircraft is moving. The stop signal 51 is sent to a rising edge confirmer 52 the output of which changes to 1, when the stop signal 51 has remained 1 for a certain time T1, of the order of a few seconds. The output of the rising edge confirmer 52 is sent to a first AND gate 53.

Besides, the computer monitors a controlled braking signal 54 for example the pilot's pressing on the rudder bar or any other braking instruction from for example the aircraft braking computer. The braking signal 54 is 1, if the braking control is activated. The braking signal 54 is sent through an inverter 55, then the inverter 55 output is sent to a rising edge confirmer 56. Then when the braking control is no longer activated, the braking signal changes to 0. The output of the inverter 55 changes to 1, whereas the output of the rising front confirmer 56 changes to 1, only after a time T2 of the order of a few seconds, during which the inlet of the rising edge confirmer 56 remained 1. The output of the rising edge confirmer 56 is the second input of the AND gate 53.

The output of the first AND gate 53 is the first input S of a flip-flop 57. The output of the flip-flop 57 changes to 1, when the first input S changes to 1, and the output of the flip-flop 57 remains 1 whatever the subsequent value of the inlet S. The change to 1 of the flip-flop 57 output means that the aircraft is in a potential towing situation (the aircraft has stopped for some time and the brakes have been released for some time). The change to 1 of the flip-flop 57 output then causes the return of the hydraulic connecting block 10, such that a towing can optionally be performed without the steering control attempting to oppose the forced steering of wheels due to the towing.

The leaving of the towing situation i.e. the reactivation of the steering control, is performed in response to the detection of an event signaling that the aircraft is obviously no longer in the towing situation. For this purpose, the second input R* of the flip-flop is used, the changing to 1 of which causes the resetting of the flip-flop 57 output, which results in the placing back of the valve 11 in a position for supplying the hydraulic connecting block 10.

In this case, it has been chosen to monitor four particular events:
  a engine thrust control beyond a threshold P1;
  an aircraft taxi speed beyond a threshold V1;
  a controlled steering velocity beyond a threshold 1;
  the occurrence of a braking instruction.

In practice, the second input R* of the flip-flop 57 is composed of the output of an OR gate 58, the four inputs of which are as follows:

1. The output of a comparator 63 which compares the engine thrust signal 64 to a threshold P1 and which sends back a 1 output, if the engine thrust 64 exceeds the threshold P1. The thrust threshold P1 is selected to be slightly greater than the engine idling speed thrust;

2. The output of a comparator 62 which compares the aircraft 59 taxi speed to a speed threshold V1 and sends back a 1 output, if the aircraft 59 taxi speed exceeds or is equal to a speed threshold V1. The threshold V1 is in practice selected to be the maximum authorized towing speed.

3. The output of a comparator 60 which compares a controlled steering angular velocity signal 61 to a threshold 1 and sends back a 1 output, if the controlled /steering angular velocity exceeds the threshold 1, i.e. if the pilot activated a steering angle control, through the wheel or the rudder bar or the computer itself, so that the rotation angular velocity requested exceeds the threshold 1. The threshold 1 is chosen in practice to be low, but preferably not equal to 0, to take into account a residual noise affecting the signal. Of course, the steering control angular velocity signal is an absolute velocity signal which does not take into account the steering direction requested by the pilot;

4. The controlled braking signal 54.

When one of the inputs of the OR gate 58 changes to 1 then its output changes to 1 which results in the resetting of the output of the flip-flop 57. The valve 11 is then placed back in supply position. The steering control is reactivated.

Thus, when monitoring one or several taxi parameters of the aircraft, the computer 50 detects a situation in which the aircraft is likely to be towed and places the steering control in the free steering mode in response to this detection, such that a towing can effectively be performed without any risk of deterioration. The reactivation of the steering control is performed as soon as the computer 50 identifies an event indicating that the aircraft has obviously left the potential towing situation.

Figure 4:
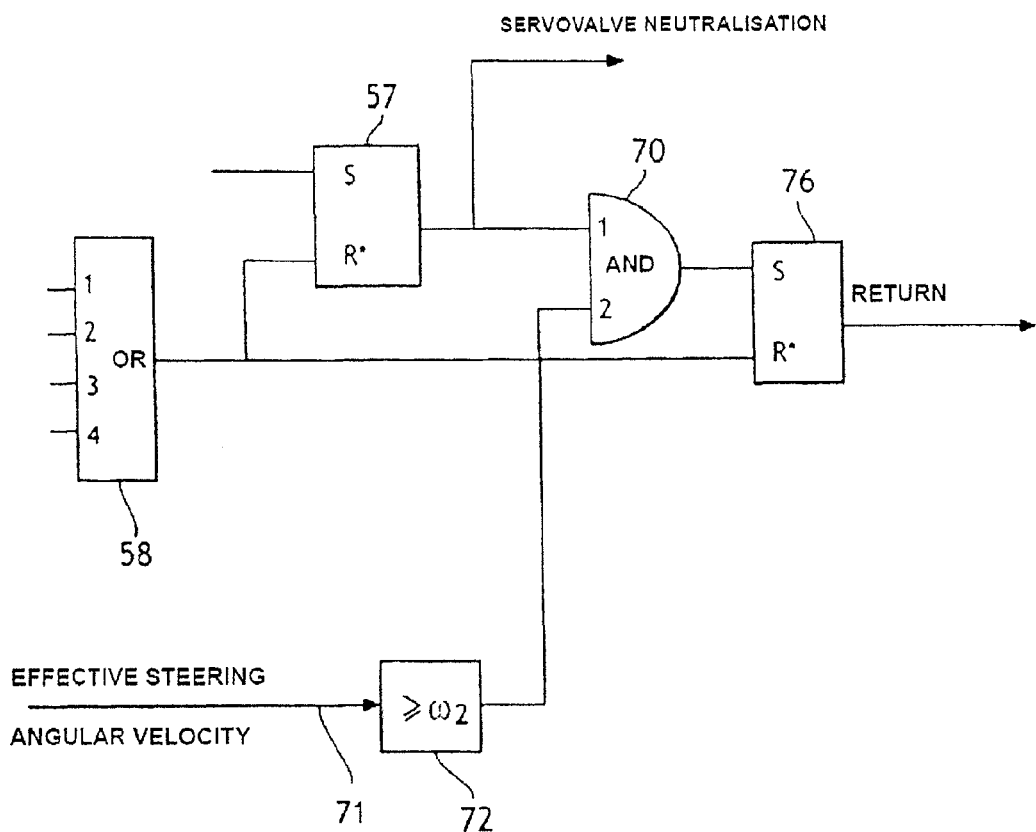
FIG. 4 is another variation of the logic of FIG. 3.

According to a variation illustrated in FIG. 4, the hydraulic connecting block return is requested only if the towing being effectively performed has been detected. According to this implementation mode, the servovalve is neutralized in response to the detection of the occurrence of a potential towing situation and the hydraulic connecting block is placed in the return position only if it has been detected that a towing is being performed. Then, pressure drops and pressurizations which unnecessarily wear the hydraulic connecting block and its components, as well as useless activations of the valve 11 are avoided.

For this purpose, the logic of FIG. 3 is used again in its entirety. In FIG. 4, said logic was not shown in detail, but the flip-flop 57 and the OR gate 58 can be seen, the respective inputs of which are strictly similar to those illustrated in FIG. 3.

In this case, however, the output of the flip-flop 57 not only causes the return of the hydraulic connecting block, but as mentioned above, the neutralization of the servovalve 13

The output of the flip 57 which constitutes one of the inputs of a second AND gate 70 is used to request the return position of the hydraulic connecting block 10.

The other one of the inputs of the AND gate 70 is constituted by the following signal. The computer 50 monitors the steering effective angular velocity signal 71 (it should be noted that this steering effective angular, which is the angular velocity at which the collar 5 rotates on the box 1, in response either to a steering instruction or to a steering imposed by the tractor should not be mixed with the controlled steering angular velocity signal 61 which is the velocity requested in or deduced from the steering instruction given by the pilot or by the computer). The steering effective angular velocity signal 71 is supplied to a comparator 72 which compares the steering effective angular velocity 71 to a threshold 2 and supplies a 1 output, if the steering effective angular velocity exceeds this threshold. Of course, the signal here is a steering effective angular velocity absolute signal which does not take into account the effective steering direction.

The output of the comparator 72 constitutes a second input of the AND gate 70. When the steering effective angular velocity 71 is greater than the threshold 2, the second input of the second AND gate changes to 1, which means, together with the fact that no steering has been requested (input 3 of the OR gate 58), that a towing operation is being performed. Since the first input of the second AND gate 70 is still 1, the output of the second AND gate 70 changes to 1.

The output of the AND gate 70 is now the input S of a second flip-flop 76. The output of the second flip-flop 76 changes to 1, when the output of the AND gate 70 changes to 1 and remains 1 even though the output of the AND gate changes to 0. Now, it is the output of the flip-flop 76 which causes the setting of the hydraulic connecting block to the return position. The output of the flip-flop 76 is reset, when its second input R* changes to 1. It can be seen here that the input R* of the second flip-flop 76 is composed of the same signal as the input R * of the first flip-flop 57 i.e., the output of the OR gate 58.

Thus, according to a first aspect, when a potential towing situation is detected, the servovalve 13 is only neutralized which allows a safe towing operation, if need be. If no towing operation is performed and, if one of the events marking the end of the potential towing situation occurs, then the servovalve is reactivated which is done in a minimum time. An activated steering control is then very quickly available to the pilot when the potential towing situation does not exist any longer. Besides, the hydraulic connecting block remained pressurized and thus, no pressure drop or pressurization which could affect its resistance to fatigue, occurred. Only if the towing operation is effectively performed which is indicated by the detection of an effective rotation angular velocity of the collar while no steering is requested (input 3 of the OR gate 58) then the hydraulic connecting block 10 will be positioned on the return situation.

The hydraulic connecting block 10 being on the return position, an untimely activation of the servovalve 13 during the towing would have no effect since the hydraulic connecting block 10 is no longer under pressure. Such return position of the hydraulic connecting block 10 guarantees an increased safety.

Figure 5:
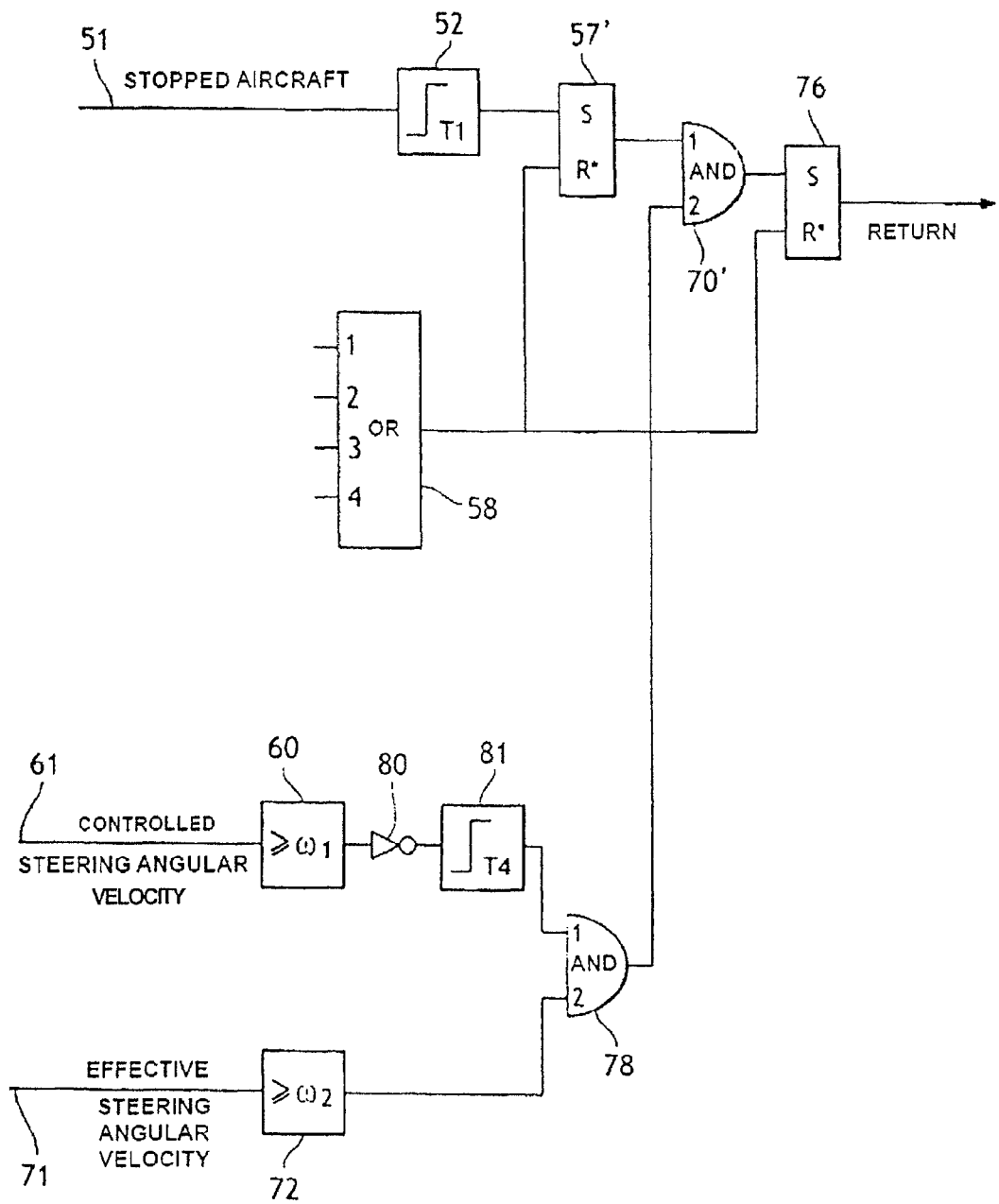
FIG. 5 is the diagram of the logic for the passage of the steering control to a free steering mode according to a second embodiment of the method of the invention.

The invention can also be implemented according to another logic illustrated in FIG. 5. The flip-flop 57', similar to the flip-flop 57 of the previous logic can be seen. However, the first input S of the flip-flop 57' is directly constituted of the signal of the stopped aircraft 51, processed by the rising edge confirmer 52. The second input R* of the flip-flop 57' is like in the previous logic constituted by the output of the OR gate 58, which includes exactly the same inputs.

The output of the flip-flop 57' is supplied to an AND gate 70' similar to the AND gate 70 of FIG. 4 except for the fact that its second input is now constituted of the output of an auxiliary AND gate 78, the two inputs of which are as follows:

1. The controlled steering angular velocity signal 61 is submitted to a comparator 60 which compares the controlled steering angular velocity with the threshold 1. The output of the comparator 60 is sent to an inverter 80 and the output of the inverter 80 is supplied to a rising edge confirmer 81 (the delay of which takes into account the steering control dynamics), the output of which is the first input of the auxiliary AND gate 78;

2. The steering effective angular velocity signal 71 is submitted to a comparator 72 which compares the steering effective angular velocity with the threshold 2. The output of the comparator 62 is the second input of the auxiliary AND gate 78.

As mentioned above, the steering effective or controlled angular velocity signal are considered here as an absolute value.

The output of the AND gate 70' is then the input S of the second flip-flop 76, like in FIG. 5. The second input R* of the second flip-flop is, as mentioned above, composed of the output of the OR gate 58. The change to 1 of the output of the second flip-flop 76 causes the change of the steering control to the free steering mode, in this case through the setting of the hydraulic connecting block to the return position.

The operation of this logic is as follows. When the aircraft has stopped for a time T1, the output of the flip-flop 70 changes to 1. Then, the aircraft is in an intermediate situation in which it could be towed. However, this has been chosen here not to put the steering control in the free steering mode in response to the detection of a simple stoppage of the aircraft. As a matter of fact, if the aircraft is subsequently towed straight forward, the steering control can remain activated which does not hinder the straight forward towing. However, such capacity to be towed straight forward is of course not sufficient in most cases for a real towing in which the tractor makes the aircraft turn. Then, the straight forward towing cannot be considered as a real towing operation. Then, it is chosen to place the steering control in free steering mode only if a real towing operation with turns has started. Therefore, the following additional conditions are detected (via the AND 78 and 70' gates):

the controlled steering angular velocity 61 has not exceeded the threshold 1 for at least the time T4 associated with a confirmer 81, and the steering effective angular velocity 71 which is for example imparted to wheels and the collar by the turning tractor exceeds the threshold 2.

Then, the steering control is set on a free steering mode in response to the detection of a verified or effective towing situation. The steering control remains then always active unless a true towing operation (which means it includes turns) is effectively performed.

Thus, in the various illustrated logics, a second number of taxi parameters are monitored to detect a potential towing situation or a real towing situation, and the steering control is deactivated in response to this detection. The reactivation of the steering on control is made in response to the detection of an event which indicates that the aircraft is no longer in a towing situation.

It should be noted that the detection according to the invention of an event signaling the end of the towing situation makes it possible to remedy a fault of the computer which would have set by mistake the steering control to a free steering mode, whereas the aircraft is not in a towing situation. As a matter of fact, during a non towed taxi phase (for example when landing or during an autonomous travel on the taxiways of the airport), the monitored signals for detecting an event signaling the end of the towing situation are also indicative of such a taxi phase: the output of the OR gate 58 necessarily changes to 1 at one moment of the taxi, for example as soon as the aircraft velocity exceeds the threshold V1, or as soon as the reactors thrust exceeds the threshold P1. The flip-flop or flip-flops is/are then reset which entails the reactivation of the steering control. The pilot is then sure that the steering control will be automatically activated either upon completion of the towing situation or after an unduly change to the free steering mode, so that the risk of not having available the steering control during the phase when it can be necessary is very small.

Thereabout, it is important to note that the towing situation is identified by a combination of taxi parameters (signals 51, 54 in FIGS. 3 and 4, signals 51, 61, 71 in FIG. 5) which is not the same as a combination of taxi parameters which is indicative of the end of the towing situation or the absence of this situation (signals 64, 59, 61, 54 in FIGS. 3, 4 and 5). Then, the situation of the prior art, consisting in using only one non-taxi parameter (value of the signal from the sensor connected to the lever) to decide whether the steering control should be activated or deactivated, is avoided. In this case, unduly deactivations or activations can be obtained if the signal is not reliable.

By selecting, according to the invention, two distinct combinations of taxi parameters to identify whether the aircraft is in a towing situation or is not in a towing situation, the management of the steering control does not depend on the value of only one signal, whether it is monitored or obtained with logic gates.

Of course, the combinations given here are given for illustration purposes and any other combination of taxi parameters can be considered, each of the combination being, if need be, only one taxi parameter. Monitoring only one taxi parameter can be decided if the value of such parameter is reliable enough to decide whether the aircraft is in a towing situation or in a non-towing situation.

The invention is not limited to the description above but on the contrary encompasses any variation falling in the scope defined by the claims.

More particularly, although the invention has been illustrated with a hydraulic steering control, the invention can of course be applied to an aircraft including an electric steering control.

Although, in the illustrated logic, steering effective angular velocity and controlled steering angular velocity signals are used, such signals can of course be recomposed by respectively deriving adequately filtered steering effective angle and controlled steering angle signals.

Of course, the signals used will be submitted to all the appropriate processing prior to being processed by the steering control management logic (filtering, noise removing), as is already known by the specialists in the art.

Eventually, although it was mentioned that some taxi parameters are monitored to implement the described logic, a reduced or a more important number can of course be used. Thus, it can be decided for example to position the steering control in the free steering mode as soon as the stoppage of the aircraft is detected. A longitudinal acceleration signal can also be monitored to reactivate the steering control.

The invention claimed is:

1. A method for managing a steering control of an aircraft landing gear having at least one wheel steerable by said steering control, which is operated by a computer, comprising the following steps:
   monitoring at least one taxi parameter of the aircraft to determine whether the aircraft enters or leaves a towing situation;
   Automatically deactivating the steering control, by setting the steering control in a free steering mode of the steerable wheel, in response to the aircraft entering said towing situation;
   Automatically reactivating the steering control by setting the steering control into an active mode so that the steerable wheel has an angular steering controlled by the steering control in response to the aircraft leaving said towing situation.

2. A method according to claim 1, wherein a first logic combination of several taxi parameters is performed to define an event, the occurrence of which indicates that the aircraft enters said towing situation.

3. A method according to claim 2, wherein a second logic combination of several aircraft taxi parameters, which is different from the first combination, is performed to define an event, the occurrence of which indicates that the aircraft leaves said towing situation.

4. A method according to claim 3, wherein the automatically deactivating step comprises the aircraft entering a potential towing situation, which is based upon a first set of events in which the aircraft is likely to be towed.

5. A method according to claim 4, wherein the aircraft enters the potential towing situation, when the following event is detected:
   the aircraft has stopped for some time and
   no braking control has been activated for some time.

6. A method according to claim 5, applied to a hydraulic steering control comprising a servovalve, wherein the steering control is placed in the free steering mode by neutralizing the servovalve.

7. A method according to claim 6, wherein the steering control is further placed in the hydraulic return position if, after neutralizing the servovalve, it is detected that the steering effective angular velocity of wheels is above a predetermined threshold.

8. A method according to claim 3, wherein the towing situation corresponds to an effective towing situation, which is based upon a second set of events at least one of which differs from a first set of events for a potential towing situation, during which a towing is effectively in process.

9. A method according to claim 8, wherein the automatically deactivating step comprises the aircraft entering the effective towing situation when the following events are detected:
   the aircraft has stopped for a predetermined period of time and
   the steering effective angular velocity of the wheels exceeds a predetermined threshold and
   the controlled steering angular velocity of the wheels did not remain above the predetermined threshold for a predetermined period of time.

10. A method according to claim 3, wherein the automatically reactivating step comprises the aircraft leaving the towing situation when the following event is detected:
    the engine thrust exceeds a predetermined threshold; or
    the taxi speed of the aircraft exceeds a predetermined threshold; or
    the controlled steering angular velocity exceeds a predetermined threshold; or
    the braking control has been activated.

* * * * *